(12) United States Patent
Hutchinson et al.

(10) Patent No.: US 8,892,920 B2
(45) Date of Patent: Nov. 18, 2014

(54) SYSTEM AND METHOD FOR CONSERVING ENERGY IN A DIGITAL HOME NETWORKING DEVICE

(75) Inventors: Daniel Mark Hutchinson, Carmel, IN (US); Dinesh Ambravaneswaran, Westfield, IN (US); William John Testin, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 220 days.

(21) Appl. No.: 13/518,658

(22) PCT Filed: Jan. 15, 2010

(86) PCT No.: PCT/US2010/021118
§ 371 (c)(1),
(2), (4) Date: Jun. 22, 2012

(87) PCT Pub. No.: WO2011/087504
PCT Pub. Date: Jul. 21, 2011

(65) Prior Publication Data
US 2012/0266003 A1 Oct. 18, 2012

(51) Int. Cl.
*G06F 1/32* (2006.01)
*H04N 5/44* (2011.01)
*H04N 5/63* (2006.01)
*H04N 21/436* (2011.01)
*H04N 21/462* (2011.01)
*H04W 52/02* (2009.01)
*H04N 21/443* (2011.01)
*H04N 21/45* (2011.01)

(52) U.S. Cl.
CPC .............. *H04N 5/4401* (2013.01); *H04N 5/63* (2013.01); *H04N 21/43615* (2013.01); *H04N 21/4622* (2013.01); *H04W 52/0229* (2013.01); *H04W 52/0254* (2013.01); *H04N 21/4436* (2013.01); *H04N 21/4532* (2013.01); *Y02B 60/50* (2013.01)
USPC ........................... 713/320; 713/322; 713/324

(58) Field of Classification Search
CPC ...... G06F 1/3203; G06F 1/3206; G06F 1/324
USPC ......................................... 713/320, 322, 324
See application file for complete search history.

(56) References Cited

U.S. PATENT DOCUMENTS 6,477,654 B1 * 11/2002 Dean et al. .................... 713/300
6,593,785 B1 * 7/2003 Field et al. .................... 327/156

(Continued)

FOREIGN PATENT DOCUMENTS

| EP | 1742425 | 1/2007 |
| EP | 1976275 | 10/2008 |

(Continued)

OTHER PUBLICATIONS

Search Report dated Sep. 30, 2010.

*Primary Examiner* — Vincent Tran
(74) *Attorney, Agent, or Firm* — Robert D. Shedd; Vincent E. Duffy; Michael A. Pugel

(57) ABSTRACT

A method and apparatus configures a power level for a device able to receive audio, video, and data signals. An input signal is received by a receiver capable of receiving broadcast data signals and digital home networking signals. The system determines if the receiver is operating in a first mode having a first power level or a second mode having a second power level based on a type of input signal received by the receiver. A control signal is generated for modifying at least one setting on a first circuit for configuring the first circuit to operate according to the first power level if the input signal is a first type of input signal. The control signal is provided to the first circuit and the first circuit is configured to operate according to the first power level based on the control signal.

30 Claims, 7 Drawing Sheets

(56) References Cited

U.S. PATENT DOCUMENTS

| | | |
|---|---|---|
| 7,178,044 B2 * | 2/2007 | Pappalardo et al. ........... 713/300 |
| 7,404,090 B1 * | 7/2008 | Lewicki et al. ................ 713/300 |
| 7,414,676 B2 * | 8/2008 | Lindstrom et al. ............. 348/731 |
| 7,991,992 B2 * | 8/2011 | Guan et al. .................... 713/100 |
| 2004/0254683 A1 | 12/2004 | Kim |
| 2005/0076374 A1 | 4/2005 | Nakamura |
| 2005/0128056 A1 * | 6/2005 | Browning ................ 340/286.02 |
| 2005/0285682 A1 * | 12/2005 | Lee et al. ....................... 330/297 |
| 2006/0225109 A1 * | 10/2006 | Seo ................................ 725/100 |
| 2007/0130280 A1 | 6/2007 | Park et al. |
| 2007/0149163 A1 | 6/2007 | Yasuta |
| 2008/0037563 A1 | 2/2008 | Bernard |
| 2009/0237384 A1 * | 9/2009 | Hu ................................. 345/211 |
| 2011/0281543 A1 * | 11/2011 | White et al. .................. 455/337 |

FOREIGN PATENT DOCUMENTS

| | | |
|---|---|---|
| JP | 2001094902 | 4/2001 |
| JP | 2002171493 | 6/2002 |
| JP | 2005073142 | 3/2005 |
| JP | 2005295393 | 10/2005 |
| JP | 2007180619 | 7/2007 |
| JP | 2008245170 | 10/2008 |
| WO | WO2004057862 | 7/2004 |
| WO | WO2007112188 | 10/2007 |

* cited by examiner

SYSTEM AND METHOD FOR CONSERVING ENERGY IN A DIGITAL HOME NETWORKING DEVICE

This application claims the benefit, under 35 U.S.C. §365 of International Application PCT/US10/021118, filed Jan. 15, 2010, which was published in accordance with PCT Article 21(2) on Jul. 21, 2011 in English.

FIELD OF THE INVENTION

The present disclosure relates generally to an apparatus for receiving audio, video, and data signals and, more specifically, to a settop box for automatically adjusting the power usage of digital home networking circuits in response to detecting an operational mode of the settop box.

BACKGROUND OF THE INVENTION

This section is intended to introduce the reader to various aspects of art, which may be related to various aspects of the present embodiments that are described below. This discussion is believed to be helpful in providing the reader with background information to facilitate a better understanding of the various aspects of the present invention. Accordingly, it should be understood that these statements are to be read in this light, and not as admissions of prior art.

Advanced settop boxes, such as those used for receiving terrestrial, cable or satellite signals, often include one or more of a variety of additional networking capabilities. Digital Home Networking (DHN) services are often included as a feature that allows multiple settop boxes, usually located in a single customer's premises, to communicate with each other. One popular DHN protocol has been created by the Multimedia over Cable Alliance (MoCA) and involves transmitted content and control information between settop boxes using the same cabling system used to deliver the primary broadcast (i.e. cable or satellite broadcast) service. Including MoCA with the delivery of satellite based services generally requires that the frequency spectrum used for the home networking system be outside the spectrum used for the various satellite delivery systems. These settop boxes are able to operate in different network configurations. For example, these settop boxes are able to operate in a traditional network configuration wherein they receive signals in the L-Band, 950-2150 Megahertz (MHz), and B-band, 250-800 MHz, frequency ranges. Alternatively, these settop boxes are able to operate in a single wire module (SWM) network configuration wherein they receive L-band satellite signals and transmit/receive digital home networking signals.

As these settop boxes include a complex design of multi-functional circuits, there is a concern to minimize the amount of power consumed by these boxes. Additionally, in certain jurisdictions, these settop boxes must be designed to comply with energy efficiency standards. For example, for use in the United States, the settop boxes must be designed to comply with the power levels set forth by the federal Energy Star Program. Reducing the amount of power consumed by these devices is not only environmentally beneficial but also improves operation of these devices because it reduces the heat produced during operation. A system and method that addresses the problems associated with minimizing power consumed by a settop box that employs both home networking communications in conjunction with broadcast communications is desired.

SUMMARY OF THE INVENTION

In one embodiment, a method comprising the steps of receiving at least one of a first type of input signal and a second type of input signal, determining if the received signal is of the first type of input signal or the second type of input signal, generating (216) a first control signal associated with a first operational mode, the first control signal configuring a power level for use in a first mode of operation if the received signal is of the first type of input signal, generating a second control signal associated with a second operational mode, the second control signal configuring a power level for use in a second mode of operation if the received signal is of the second type of input signal, providing the first control signal and second control signal to a first circuit, and configuring a power level of the first circuit based on the first control signal and second control signal.

In another embodiment, a method for controlling the power used in a receiver includes receiving an input signal, the input signal including at least one of a broadcast signal and a digital home networking signal, determining if the receiver is operating in a first mode having a first power level or a second mode having a second power level based on the input signal received, generating a control signal, the control signal modifying at least one setting on a first circuit to operate in the first mode if the input signal is a broadcast signal, providing the control signal to the first circuit, and configuring the first circuit to operate at a first power level based on the control signal.

A further embodiment includes an apparatus including a digital home networking circuit that transmits and receives a digital home networking signal, the digital home networking circuit operating in at least one of a first power mode and a second power mode, a system controller coupled to said digital home networking circuit, the system controller analyzing a received input signal received to determine if the received signal is a first signal type or a second signal type and generating a control signal in response to the received input signal, and a power source coupled to the digital home networking circuit and the system controller, the power source providing power to the digital home networking circuit at a first power level in the first power mode or a second power level in the second power mode in response to the control signal.

DETAILED DESCRIPTION

Figure 1:
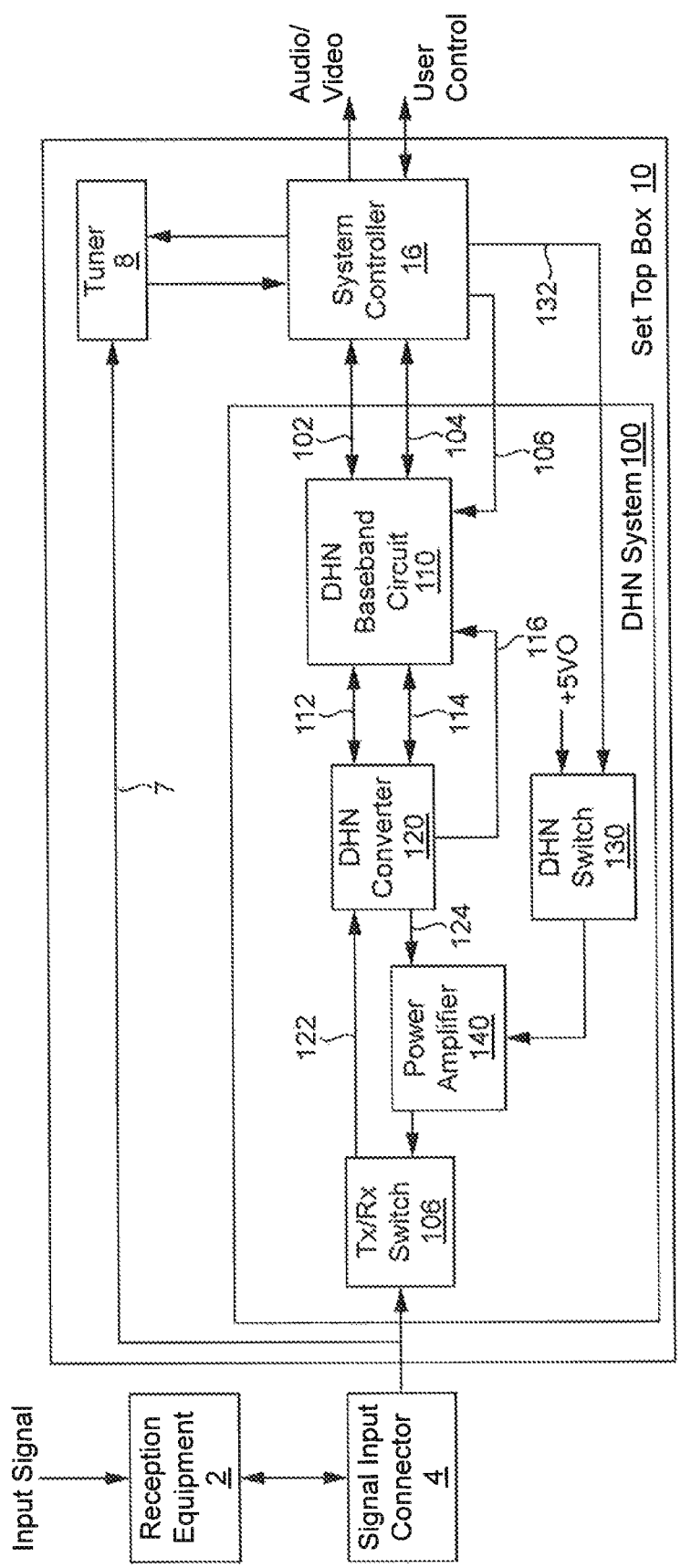
FIG. 1 is a block diagram of an embodiment of a home communications and broadcast signal receiving system according to aspects of the present disclosure.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to broadcast signals, and more particularly to broadcast signals as defined for use in a satellite signal and home networking system. The embodiments described may be used in a settop box, television, or similar signal receiving device. Examples of similar devices include, but are not limited to, cellular phones, intelligent phones, personal digital assistants, and laptop computers. Other systems utilized to receive other types of signals may include similar structures and processes. Those of ordinary skill in the art will appreciate that the embodiments of the circuits and processes described herein are merely one set of potential embodiments. It is important to note that signals compliant with various broadcast and wireless standards in general, may be transmitted in a manner other than over a satellite or cable network, including transmission over the air, through a wireless network, or over telephone lines. As such, in alternate embodiments, the components of the system may be rearranged or omitted, or additional components may be added. For example, with minor modifications, the system described may be configured for use in other terrestrial broadcast services, wi-fi video and audio services, or phone data services, including services used elsewhere in the world.

The embodiments described below are primarily related to the transmission and reception of signals. Certain aspects of the embodiments including, but not limited to, certain control signals and power supply connections have not been described or shown in the figures but may easily be ascertained by a skilled artisan. It should be noted that the embodiments may be implemented using hardware, software, or any combination of both, including the use of a microprocessor and program code or custom integrated circuits. It should also be noted that many of the embodiments involve iterative operation and connection between the various elements of the embodiment. Alternative embodiments may be possible using pipelining architectures employing repeated identical elements, connected in series, in place of, or in addition to, the iteration operation embodiments described herein.

Energy management compliance, such as Energy Star, is generally a design requirement for consumer electronic devices. Mid-RF MoCA is an example of emerging technology for a DHN system and is based on the digital home networking transceiver and up/dn converter chipsets. Practically all the power dissipation of the DHN modem is in these two chips and the Transmission (Tx) Power Amplifier. There are instances when the host device (e.g. Satellite Set-Top-Box) is operational, but the DHN modem may be turned off or put in a low-power, or low energy usage, mode, and vise-versa. A combination of register settings on the particular integrated circuits and a control signal for modifying the register settings put the DHN chips in and out of the low-power mode. Additionally, the Tx Power Amplifier is turned on and off with a control signal and metal-oxide-semiconductor field-effect transistor (MOSFET) switch. A system as described below implements a control algorithm to control the state (e.g. on, or energy saving) of the MoCA modem. The system advantageously takes into account the power needs of a settop box based on a type of settop box and a type of signal being received by the settop box. For example, in a non-digital video recording (DVR) enabled settop box, the DHN modem is not needed when the settop is in its power saving state (e.g. stand-by mode) or in use with an incompatible network (i.e. Ethernet as opposed to MoCA). Alternatively, in a MR equipped settop box, the DHN modem must be operational when the host is in its power saving state (stand-by mode) so it can respond to requests from other devices on the DHN network, but is not needed when connected to an incompatible network.

A system and method is provided for configuring the power settings of a device for receiving and transmitting home networking communications in order to conserve energy. In settop boxes that are able to receive both cable/satellite broadcast signals and digital home networking signals, it is important to maintain the power level provided to the circuits at certain levels. This is particularly important in jurisdictions whereby consumer electronic devices must operate within a specific set of guidelines that detail energy usage and consumption. Therefore, as these multifunction settop boxes perform many tasks it is important to use power in the most efficient manner in order to comply with any electrical consumption standards. The architecture and process implemented by the system advantageously provides for the automatic configuration of power modes for different respective integrated circuits of the system based on the actual mode of operation as determined by the system as well in response to user profile data that is provided for the system.

An exemplary energy conserving signal transceiver system is described herein. The energy conserving signal transceiver is able to receive two different types of data signals via the same input path, for example a broadcast data signal and a digital home networking signal, as well as transmit a digital home networking signal. As described herein the transceiver is a settop box. However, one skilled in the art will appreciate that the circuits and operation thereof which are described in the settop box may be implemented in another consumer electronic device that receives both broadcast data signals and digital home networking signals.

Turning to FIG. 1, a block diagram of an embodiment of a home communications and broadcast receiving settop box 10 is shown. Settop box 10 may be used for transmitting and receiving audio, video and data signals. Settop box 10 may be capable of receiving satellite signal data and digital home networking data provided through reception equipment 2. Reception equipment 2 receives at least one input signal and provides the received input signal to an input connector 4 of the settop box 10. Reception equipment 2 is able to receive at least one of (a) broadcast data signals, for example Digital Satellite Equipment Control (DiseqC) signals and (b) broadcast signals and digital home networking signals. Reception equipment 2 includes, for example, a satellite dish and other known associated electronic circuitry for receiving any of broadcast signals or digital home networking signals. Reception equipment 2 also includes an interface to other home networking devices, such as computers, routers, and telephones, in a customer's premises. Settop box 10 includes a system controller 16 connected to the input connecter through tuner 8 and also connected to the DHN system 100. System controller 100 controls the operation of all elements and other circuits within settop box 10. The DHN system 100 and tuner 8 perform device specific functions. Tuner 8 receives and demodulates broadcast signals. While only a single tuner 8 is referenced, one skilled in the art would appreciate that multiple tuners able to tune different channels at substantially the same time may be included in settop box 10. The tuner 8 selectively demodulates broadcast audio/video signals 7 that are received at the input connector 4 and which are determined by the system controller 16 to be broadcast in a known manner, such as by a specific service provider. System controller processes the broadcast signals from tuner 8 and provides them as audio/video signals for display on a display device, such as a television or monitor.

The settop box 10 further includes a Transmit/Receive (Tx/Rx) switch 106 coupled between the input connector 4 and the DHN system 100. A power source 9 is coupled to the system controller 16 and the DHN system 100 for selectively providing power to these components. The power source 9 receives power from a home power outlet (e.g. 110 volts alternating current), and converts the home power for use by circuits in the settop box 10. It should be noted that while the power source 9 is shown coupled to the DHN system 100 and the system controller 16 for purposes of example only, the power source 9 may be coupled to any other circuits within settop box 10 for providing power thereto.

The DHN system 100 includes a DHN baseband circuit 110, a DHN up/dn converter 120, a DHN switch 130 (e.g. a MOSFET switch), a Tx/Rx Switch 106, and a power amplifier 140. The system controller 16 is coupled to and interfaces with the DHN system 100 via a first control bus 102 and a first data bus 104. The first control bus 102 may include a Management Data Input/Output bus (MDIO) and the first data bus may include a Media Independent Interface (MII) data bus. The first control bus 102 enables bidirectional communication of control information embodied as one or more control signals between the DHN baseband circuit 110 and the system controller 16. For example, the control information may include data indicating a mode of operation for the DHN system 100 such as LOW POWER mode or FULL POWER. The data included in a control signal may be determined in response to analyzing a type of input signal received at connector 4. In one embodiment the analysis of the input signal may include the system controller 16 executing an algorithm for automatically detecting the composition of the signal whereby the system controller 16 (or other task-specific circuits of the set top box) generates a detection signal which polls the contents of the input signal being received at input connector 4. This may be performed, for example, by polling the coax for presence of a SWM-equipped outdoor unit present at a particular location. If the detection signal returned to the system controller 16 does not return a result, i.e. the test is false, then the system controller 16 determines that the settop box 10 should operate in a non-SWM mode (e.g. a DiseqC mode). If the detection signal returned to the system controller 16 returns a true value, the system controller 16 determines that the set top box is operating in an SWM mode.

In another embodiment, the analysis of the input signal may include the system controller 16 (or other dedicated circuitry within the set top box 10) detecting an amount of power of the input signal in order to identify the operational mode required for demodulating the input signal. The system controller 16 detects the amount of power present at the input of settop box 10 within a first frequency range, i.e. 250 MHz and 950 MHz and a second narrower frequency range, i.e. 500 MHz and 600 MHz. In response to a detected result that power is present outside the DHN frequency range, the settop box 10 will default to operate in non-SWM (e.g. DiseqC) mode). In response to a report that power is not present at signals outside of the DHN frequency but senses power within the DHN band frequency range, the system controller 16 generates and transmits a SWM polling signal which is sent out to verify the presence of a SWM to identify that DHN-mode is enabled. The SWM polling signal is provided by the system controller 16 to the external reception equipment 2 via the connector 4. The system controller 16 generates and receives communication messages to and from the external SWM device (SWM's communication mode is a bidirectional Frequency Shift Keying (FSK) modulation at 2.3 MHz). The controller 16 transmits FSK polling messages that go out on the co-axial cable (coax) and if there is a SWM "master" on the coax (e.g. a satellite dish controller), it will respond and identify that the settop box 10 is to operate in SWM mode.

Alternatively, the data included in the control signal may be determined (a) in response to analyzing a type of network to which the settop box 10 is connected, (b) in response to user preferences for a type of network, (c) configuration information stored in a memory of the system controller 16 (e.g. information entered at initial setup of the set top box 10 defining the operating mode for the set top box 10), and (d) configuration defining the operating mode of the set top box 10 provided from a remote source.

The first data bus 104 enables data transmission between the DHN baseband circuit 110 and the system controller 16. The data provided over the first data bus 104 may include audio/video data derived from a digital home networking signal. In this instance, the audio/video data received by the DHN system 100 is provided to the system controller 16 and further provided to the tuner 8 and system controller 16 for demodulation and display. The system controller 16 is also coupled to the DHN baseband IC 110 via a Phase Locked Loop (PLL) control line 106 which enables or disables the reference clock signal provided to the DHN baseband circuit 110.

The DHN system 100 further includes a DHN up/dn converter circuit 120 that interfaces with the DHN baseband circuit 110 over a second control bus 112 and a second data bus 114. The DHN converter 120 includes an input for receiving a digital home networking signal 122 and an output for transmitting a digital home networking signal 124. Upon receipt of a digital home networking signals 122, the DHN converter 120 automatically converts the signal 122 from a first frequency to a second different frequency. For example, when received at input connector 4 and provided through Tx/Rx switch 106, the DHN signals have a frequency ranging between 500 MHz and 600 MHz. The DHN up/dn converter 120 shifts the frequency to roughly 25 MHz, and additionally, the up/dn converter 120 provides the 25 MHz reference clock signal 116 to the DHN baseband circuit 110 for use thereby. In transmission mode, the system controller generates a switch control signal 132 which is provided for controlling the DHN switch 130. Upon receipt of the control signal 132, the DHN switch 130 connects a power supply shown as +5VO, to the power amplifier 140 thereby amplifying the digital home networking signal 124 being transmitted.

As the set top box 10 is able to selectively receive and transmit different types of signals at different frequencies, it is advantageous to automatically configure the DHN system 100 to operate in a LOW POWER mode when the DHN system operation is not required and automatically configure the DHN system 10 operate in FULL POWER mode when needed. Thus, the DHN system 100 enables operations in a first mode (LOW POWER) and a second mode (FULL POWER).

In the first mode of operation, the system controller 16 automatically detects a type of signal that is received at the input connector 4 does not include a digital home networking signal and thus is operating in a non-SWM mode. In response to this determination, the system controller generates a LOW POWER control signal that indicates that the DHN system 100 should enter LOW POWER mode. The LOW POWER control signal is provided via the first control bus 102 to the DHN baseband IC in 110. DHN baseband circuit 110 generates a further control signal which is provided via the second control bus 112 directing the DHN converter 120 to enter LOW POWER mode. Upon entering LOW POWER the oscillator of the DHN converter 120 is disconnected from the remaining circuits of the converter 120 thereby minimizing the power consumption of the DHN up/dn converter 120. Once the DHN baseband and DHN up/dn converters are in LOW POWER mode, the system controller 16 modifies the logic level of the PLL control signal which then disables the internal clock tree in the DHN baseband circuit 110 to minimize power consumption. The system controller 16 also signals the DHN switch 130 to disconnect the 5V power source from the power amplifier 140.

In the second mode of operation, in response to determining that the signal received at input 4 includes digital home networking data, the system controller 16 determines that the DHN system 100 is to operate in FULL POWER mode. Controller 16 automatically modifies the logic of a PLL control signal to restore the reference clock signal to the DHN baseband circuit 110 and signals the DHN switch to connect the power source to the amplifier 140. Controller 16 further modifies the register values of the DHN baseband IC 110 to enter FULL POWER mode and the DHN baseband IC 110 signals the DHN converter 120 to reconnect the internal circuitry to the oscillator.

Settop box 10 may also include a user control interface connected to system controller 16. The user control interface may include direct or remote control access, such as through a keypad or touchpad, and may also include small display readout to indicate status. The user control interface may allow a user to change channels for receiving broadcast signals, as well as change settings for the power control and operation of the home networking system.

Figure 2:
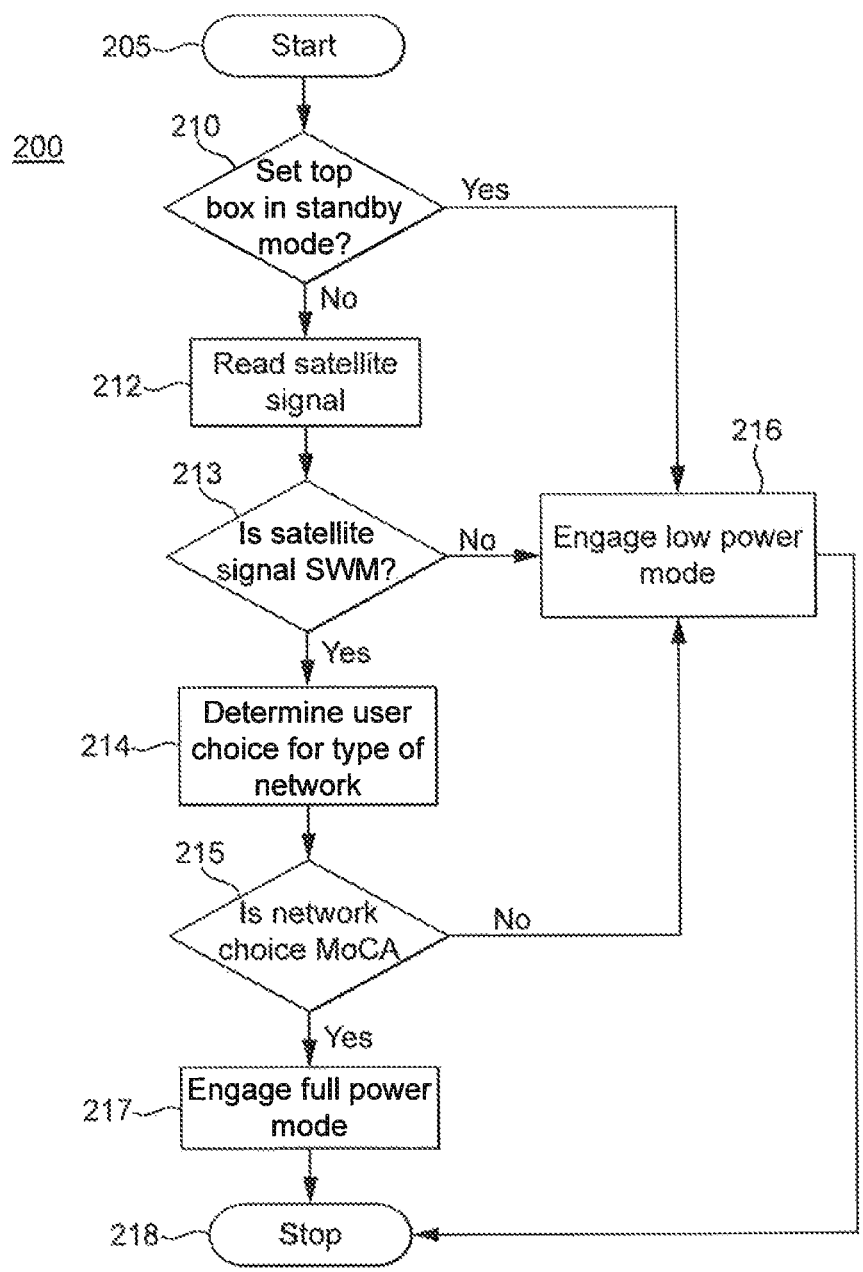
FIG. 2 is a flow diagram and embodiment of a control algorithm implemented by the home communications and broadcast signal receiving system according to aspects of the present disclosure.

Turning to FIG. 2, an exemplary power control algorithm 200 implemented by the system described in FIG. 1 is shown. The algorithm starts at step 205 and determines whether or not the DHN circuits of the settop box should be in a first LOW POWER mode or a second FULL POWER mode. At step 210, the system controller checks whether the settop box is in use or in standby mode. If the settop box is not in standby mode, the system controller checks the type of satellite signal at the input connector, step 212. If the signal is a SWM signal, step 213, the system controller checks the user selection for network Media Access Control (MAC) setting (MoCA or Ethernet) at step 214. If the user selection is MoCA mode, step 215, the system controller activates the MoCA circuits by setting up the FULL POWER mode at step 217. The MoCA integrated circuits are restored to normal operation by the sequence of register writes and control pin voltage settings as described in their specifications, and power is restored to the discrete MoCA circuits by closing a MOS FET switch.

Referring back to steps 210, 213 and 215, the algorithm enables the DHN circuits of the settop box to be in LOW POWER mode. LOW POWER mode is engaged when, in step 210, it is determined that the settop box is in STANDBY mode. Additionally, LOW POWER mode is engaged when the signal determination made in step 213 indicates the received signal is not a SWM signal. LOW POWER is also engaged when the determination in step 215 identifies the user selected network setting is other than MoCA, e.g. Ethernet. Upon determination that the MoCA circuits should be in LOW POWER mode, the system controller puts the MoCA integrated circuits in low power mode with the sequence of register writes and control pin voltage settings as described in their specifications, and power is disconnected from the discrete MoCA circuits by opening a MOSFET switch.

This algorithm may be implemented in whole or in part depending on the current operation of the settop box. This ensures that the power level required for proper operation in the current mode is achieved while advantageously dissipating the power from the circuits that are not required during that mode of operation. The algorithm may be embodied as machine readable code embodied on a computer readable medium.

The circuit diagrams of FIGS. 3-6 represent exemplary circuits similar to the blocks described above with respect to FIG. 1 and which are acted upon by the algorithm described above with respect to FIG. 2. One skilled in the art would understand that the operation of the circuits in FIGS. 3-6 are to be understood in conjunction with one another in order to toggle the power level of the DHN system 100 in settop box 10, and the signals described in the respective modes of operation in each Figure may occur substantially at the same time to effect the change in power for the DHN system 100.

Figure 3:
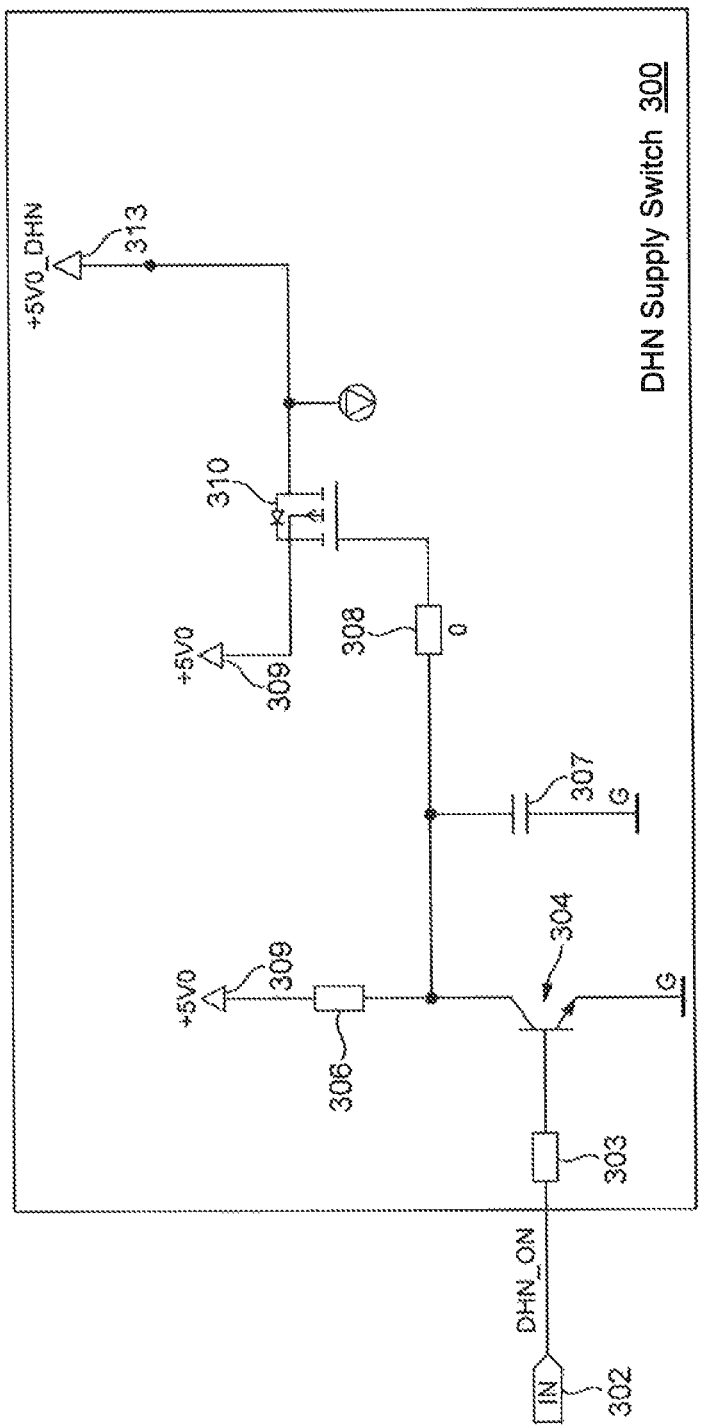
FIG. 3 is a circuit diagram of an embodiment of a supply switching circuit according to aspects of the present disclosure.

Turning to FIG. 3, a circuit diagram of an embodiment of a home networking supply switch 300 is shown. The supply switch 300 is an example circuit that may correspond to DHN supply switch 130 in FIG. 1. The DHN supply switch 300 identifies a portion of the path taken by control signal when placing the DHN circuit in FULL POWER or LOW POWER modes, DHN supply switch includes at least one input 302. A control signal, DHN_ON, identifying a power mode is received at input 302. An isolating resistor 303 is coupled between the input 302 and a bipolar (NPN type) transistor 304. A pull-up resistor 306 is coupled between a source 309 of 5V power that is provided to the transistor 304. The input 302 is buffered by bipolar transistor 304 and drives the gate of MOSFET switch 310 through an isolating resistor 308. Capacitor 307 is coupled to ground and acts as a noise filter on the switching control signal. The MOSFET 310 is used to switch the "+5V0" source provided from a power source 309 to an output 313. For example, the switch 310 may be a P-Channel MOSFET. The output 313 is coupled to a power amplifier (not shown) which amplifies a digital home networking signal being transmitted from a device such as settop box 10 in FIG. 1. In one embodiment, MOSFET switch 310 connects the "+5V0" source from the output 313 in FULL POWER mode and disconnects the "+5V0" source from the output 313 in LOW POWER mode. A power source 309 is the source of the (5V) and provides 5V to the output 313 for powering the power amplifier in FULL POWER mode.

In a first mode of operation, the power control signal directs the DHN circuit 310 to operate in FULL POWER mode. Upon receipt of the control signal at 302 (logic "1"), switch 304 buffers and inverts the signal and drives the gate of MOSFET 310 low which routes the 5V supply to a power amp, such as power amp 140 in FIG. 1.

In a second mode of operation, the control signal indicates operation in a LOW POWER mode. Upon receipt of the control signal at 302 (logic "0"), transistor 304 buffers and inverts the signal and drives the gate of MOSFET 310 high which is acting as a switch to remove the 5V supply from the output 313 which places a power amplifier, connected to the 5V supply through MOSFET 310, in LOW POWER mode.

Figure 4:
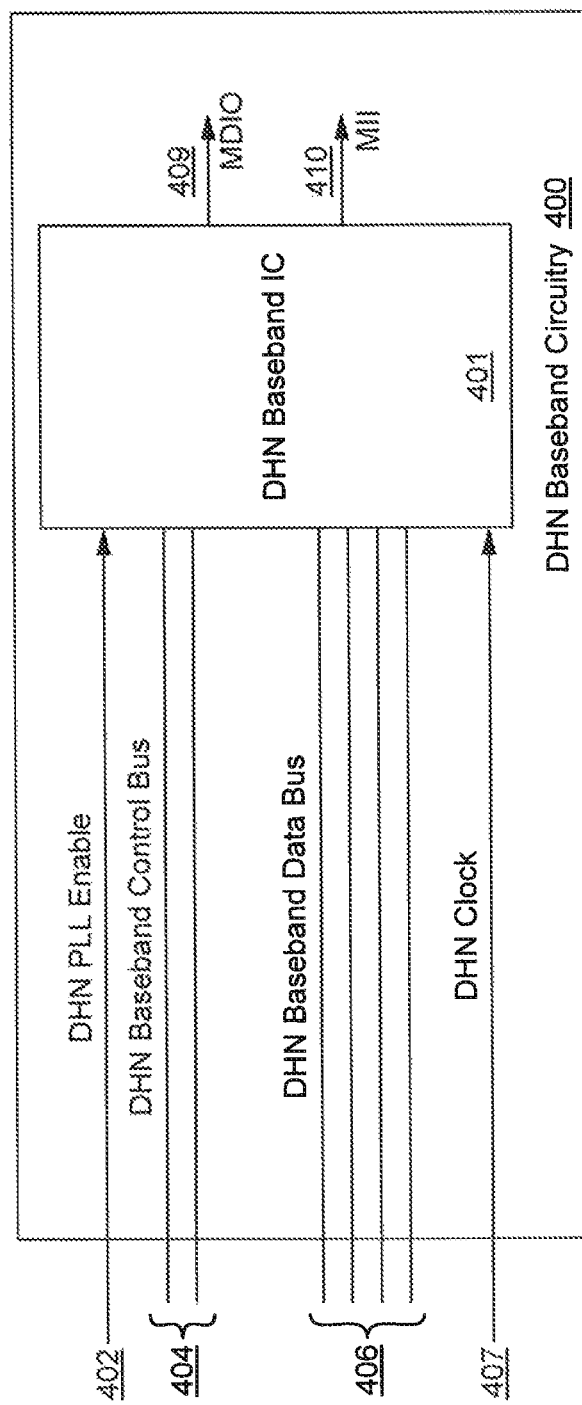
FIG. 4 is a circuit diagram of an embodiment of a home networking signal and control bus interface for a home networking baseband circuit according to aspects of the present disclosure.

Turning to FIG. 4, a circuit diagram of an embodiment of a home networking baseband circuit 400 detailing several interfaces is shown. The home networking baseband circuit 400 is an example circuit that may correspond to circuit 110 in FIG. 1. DHN circuit 400 includes a PLL_EN input line 402 that, in response to a control signal from a controller, such as system controller 16 shown in FIG. 1, selectively enables or disables the PLL of the DHN baseband integrated circuit (IC) 401. Disabling the PLL is used to reduce the power usage of the IC 401 when DHN mode is not active. The DHN baseband circuit 400 further includes a data bus 406 and a control bus 404 that connects the DHN baseband circuit 400 to a DHN up/dn converter circuit, such as DHN converter 120 shown in FIG. 1. The data bus 406 is used to transmit and receive baseband signals between the modem chip and the converter chip during the transmission and reception of digital home networking signal data in a known manner. The data bus 406 is not related to the power configuration of the chips and will not be discussed any further. The DHN clock 407 is generated in the DHN up/dn converter and provides a system clock signal to the DHN baseband circuit 400.

In the first mode of operation, referred to as FULL POWER mode, the control signal is received at pin 402 and enables the PLL on the DHN baseband circuit 400. Thus, the internal clock of the DHN circuit 400 is able to utilize the input of the system clock received on pin 407. When PLL is enabled, the DHN circuit 400 is in FULL POWER mode once the in internal registers have been initialized by the System Controller 600 over the MDIO Bus 409.

In the second mode of operation, referred to as LOW POWER mode, first a control signal is sent by the controller to the DHN baseband IC 401 to start a power down routine. The DHN baseband IC 401 initiates the power down routine that includes sending a signal over control bus 404 to the DHN up/dn converter IC in 500 to power down. Once both IC's have been powered down, the PLL_Enable line 402 is disabled to complete the power down procedure. A logic "0" on the PLL_Enable line 402 causes the PLL of the DHN baseband circuit 401 to be disabled, which halts the internal dock of the DHN circuit 401.

Figure 5:
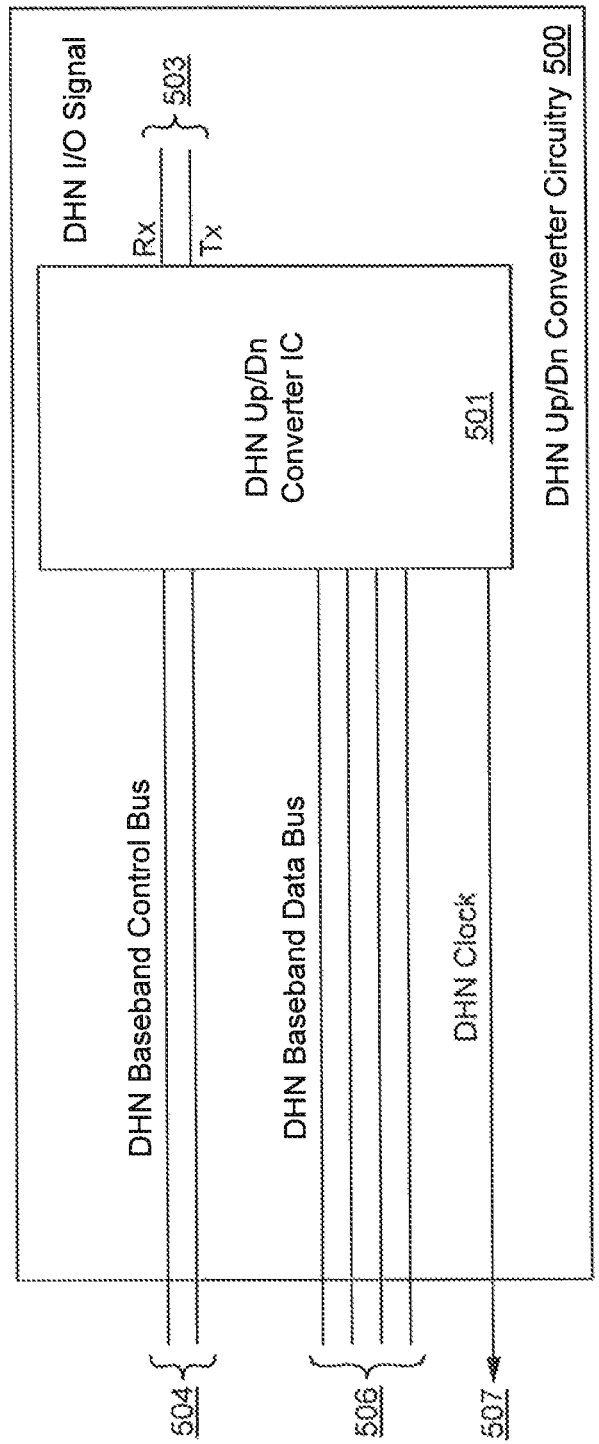
FIG. 5 is a circuit diagram of an embodiment of a home networking signal and control bus interface for home networking up/dn converter circuit according to aspects of the present disclosure.

Turning to FIG. 5, a circuit diagram of an embodiment of a home networking up/dn converter circuit 500 is shown. The up/dn converter 500 is an example circuit that may correspond to DHN converter 120 shown in FIG. 1. The up/dn converter 500 is in communication with the baseband circuit 400 described above. IC 501 is an up/dn converter IC that automatically converts the digital home networking signal from a first frequency to a second different frequency. For example, the up/dn converter in the up-convert or transmit mode, the DHN signal at 25 MHz is up converted to a frequency within the MoCA protocol range of between 475 MHz and 600 MHz. The opposite process occurs when receiving a DHN signal. This conversion may be performed in a manner well known to those skilled in the art. The IC 501 includes a data bus 506 that is connected to a baseband IC, such as DHN based band 401 in FIG. 4, through data bus 406. The IC 500 further includes a control bus 504 which enables communication between the IC 501 and the baseband IC.

In the first mode of operation, referred to as FULL POWER mode, IC 501 receives a control signal via the control bus 504 that identifies that the system is operating in FULL POWER mode and directs the IC 501 to operate in its intended manner by transmitting and receiving data in normal operating fashion. In the second mode of operation, referred to as LOW POWER mode, IC 501 receives a control signal via the control bus 504 that identifies that the system is operating in LOW POWER mode. Upon receipt of this control signal. IC 501 is caused to operate in LOW POWER mode. In LOW POWER mode, IC 501 stops transmitting DHN data and stops processing received data. Output 507 is the 25 MHZ clock generated by the DHN up/dn converter IC and is buffered to drive the input clock on a baseband IC, such as baseband IC 401 in FIG. 4.

Figure 6:
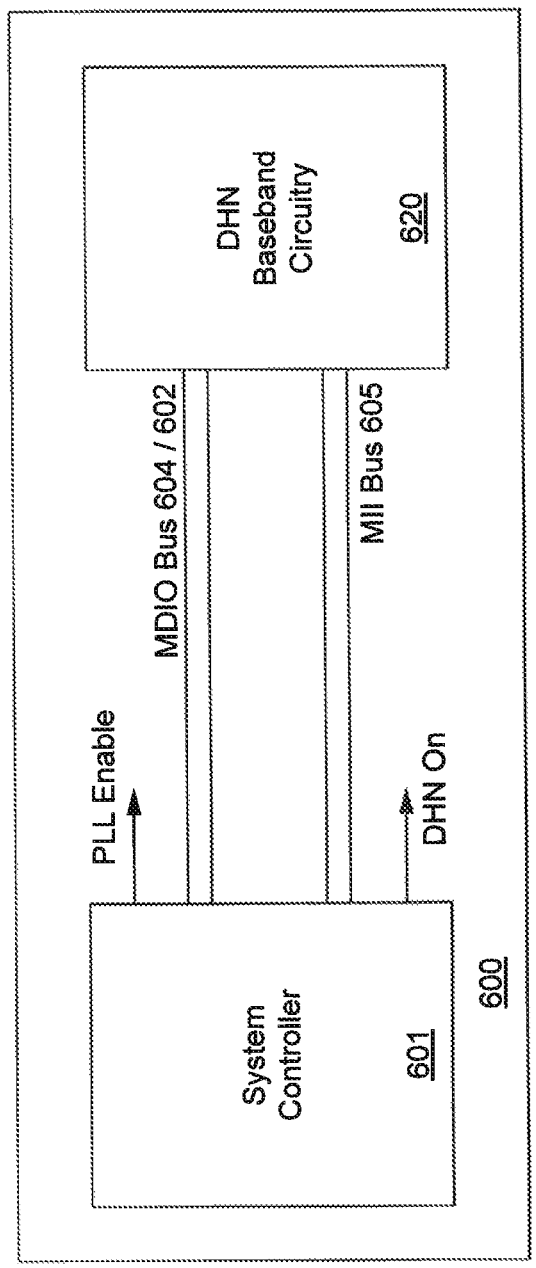
FIG. 6 is a circuit diagram of an embodiment of a home networking serial interface from a system controller to a home network circuit according to aspects of the present disclosure.

Turning now to FIG. 6, a circuit diagram of an embodiment of an interface 600 of the home networking system and system controller is shown. The System Controller 601 is an example circuit that may correspond to block 16 in FIG. 1. The DHN baseband circuit 620 is an example circuit that may correspond to block 110 in FIG. 1. The DHN baseband circuit 620 further includes a clock input 602 and system bus input/output 604. The MDIO Bus formed by clock input 602 and system bus input/output 604 is a serial bus connecting the System Controller 601 to DHN baseband circuit 620. The MDIO Bus 602/604 is a management interface that is used for controlling the way the DHN baseband IC operates. For example, MDIO Bus 602/604 allows for status and control registers on the DHN baseband IC to be read or written, MDIO Bus 602/603 is also used to download firmware, or software control algorithms, from an internal or external memory. An MU Bus 605 is used to transfer data between the DHN baseband IC and the System Controller 600. In addition, the PLL_Enable and DHN_On control lines from the System Controller are shown. The PLL_Enable line is the same as signal 402 in FIG. 4 and the DHN_On line is the same as signal 302 in FIG. 3.

Figure 7:
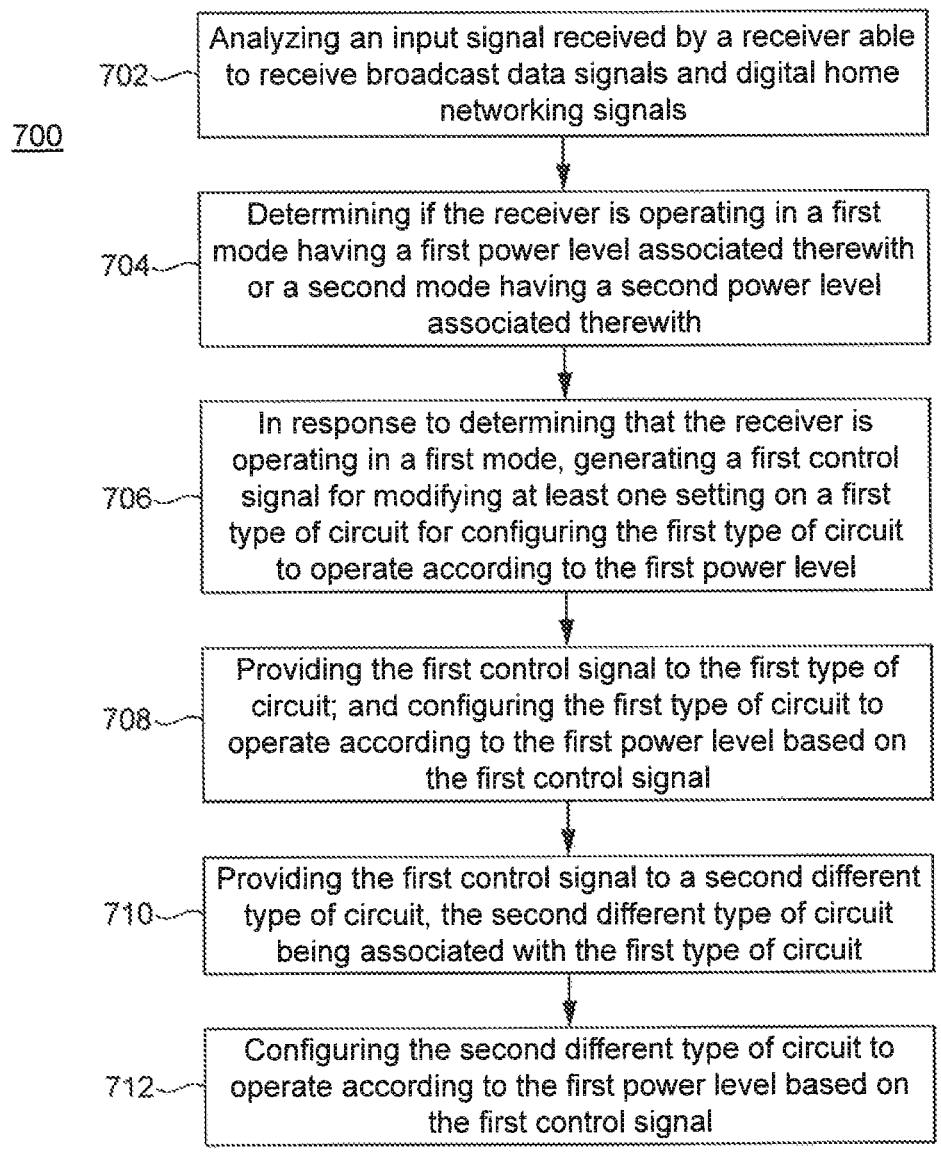
FIG. 7 is a flow diagram of an embodiment of a mode of operation of the home communications and broadcast signal receiving system according to aspects of the present disclosure.

Turning to FIG. 7, a flow diagram of an embodiment of a mode control process 700 is shown. Mode control process 700 may be used in conjunction with operation of Settop box 10 described in FIG. 1. Alternatively, mode control process 700 may be used to operate the circuits described in FIGS. 3-6. The mode control process 700 may be implemented in whole or in part depending on the current operation of the settop box. This ensures that the power level required for proper operation in the current mode is achieved while advantageously dissipating the power from the circuits that are not required during that mode of operation. The mode control process 700 may be embodied as machine readable code embodied on a computer readable medium.

In step 702, an input signal received by a receiver able to receive broadcast data signals and digital home networking signals is analyzed. Next, in step 704, the system determines, based on the input signal, if the receiver is operating in a first mode having a first power, or home energy usage, level or a second mode having a second power, or home energy usage, level. The determination in step 704 may be based on a type of input signal received in step 702. In response to determining that the receiver is operating in a first mode, a control signal is generated for modifying at least one setting on a first circuit for configuring the first circuit to operate according to the first power level as shown in step 706. The first circuit described in step 706 may be a first type of circuit, e.g. a digital home networking baseband IC.

Next, in step 708, the control signal is provided to the first circuit for configuring the first circuit to operate according to the first power level based on the control signal. In one embodiment, the step of configuring in 708 further includes disconnecting the first circuit from a main power source enabling a low power mode. In an alternate embodiment, the step of configuring in 708 includes disconnecting the first type of circuit from a main power source, modifying a register value on the first type of circuit to indicate that the first type of circuit is to operate in a low power mode, disabling a phase lock loop of the first type of circuit, and disabling an internal clock of the first type of circuit. The control signal is provided, in step 710, to a second circuit which is associated with the first circuit. The second circuit may be a second type of circuit that is different from the first circuit, e.g. a converter circuit for converting a signal from a first frequency to a second frequency. The second circuit is configured to operate according to the first power level based on the control signal in step 712. Additionally, in a further embodiment, the system controller generates a control signal for modifying at least one setting on the digital home networking circuit that configures the digital home networking circuit to operate according to the second power level in response to determining that the receiver is operating in a second mode. This control signal may configure the digital home networking circuit to operate according to the second power level based on the second control signal in response to determining the receiver is operating in a second mode.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the scope of the disclosure as defined by the following appended claims.

What is claimed is:

1. A method for controlling power level used in a signal receiving device, the method comprising the steps of:
   receiving at least one of a first type of input signal and a second type of input signal through an input of the signal receiving device;
   determining if the received signal is of the first type of input signal or the second type of input signal;
   generating a first control signal associated with a first operational mode, the first control signal configuring a power level for use in a first mode of operation if the received signal is of the first type of input signal;
   determining at least one characteristic of an operational environment of the signal receiving device to identify a preferred mode of operation if the input signal is a second type of input signal;
   generating a second control signal associated with a second operational mode, the second control signal configuring a power level for use in a second mode of operation based on the identified preferred mode of operation if the received signal is of the second type of input signal;
   providing the first control signal and second control signal to a first circuit; and
   configuring a power level of the first circuit based on the first control signal and second control signal.

2. The method of claim 1 wherein the power level for use in the first mode of operation is less than the power level for use in the second mode of operation.

3. The method of claim 1, further comprising the step of:
   providing the first control signal to a second circuit associated with the first circuit for configuring a power level of the second type of circuit to match the power level of the first type of circuit.

4. The method of claim 1, wherein said step of generating a first control signal includes
   identifying a first setting on the first circuit to be modified for configuring the first circuit to operate in a low power mode, a second setting on the first circuit to be modified for configuring the first circuit to operate in a low power mode, and a third setting on the first circuit to be modified for configuring the first circuit to operate in a low power mode; and
   compiling the data representing the first, second and third settings for inclusion within the first control signal.

5. The method of claim 4, wherein the first setting includes at least one register value of the first circuit to be modified when the first circuit is operating in low power mode, the second setting includes directing a phase lock loop of the first circuit to be disabled, and the third setting includes directing an internal clock of the first circuit to be disabled.

6. The method of claim 4, wherein the step of configuring further includes:
   modifying settings on the first circuit in response to the first, second and third setting in the first control signal; and
   engaging the first type of circuit in a low power operational mode in response to the modified settings.

7. The method of claim 1, further comprising the step of modifying one of the first control signal and the second control signal in response to the at least one characteristic.

8. A method for controlling the power used in a receiver, the method comprising the steps of:
   receiving an input signal, the input signal including at least one of a broadcast signal and a digital home networking signal;
   determining if the receiver is operating in a first mode having a first power level or a second mode having a second power level based on the input signal received;
   generating a control signal, the control signal modifying at least one setting on a first circuit to operate in the first mode if the input signal is a broadcast signal;
   modifying the control signal if the input signal is a digital home networking signal;
   providing the control signal to the first circuit; and
   configuring the first circuit to operate at the first power level or the second power level based on the control signal.

9. The method of claim 8, wherein the step of configuring further includes
   disconnecting the first circuit from a main power source to enable a low power mode as the first mode.

10. The method of claim 8, wherein the step of configuring further includes
    modifying a register value on the first circuit to indicate that the first circuit is to operate in a low power mode as the first mode;
    disabling a phase lock loop of the first circuit; and
    disabling an internal clock of the first circuit.

11. The method of claim 8, further comprising the step of:
    providing the control signal to a second circuit, the second circuit being associated with the first type of circuit; and
    configuring the second circuit to operate according to the first power level based on the control signal.

12. The method of claim 11, wherein the first circuit is a digital home networking circuit able to transmit and receive digital home networking data and the second circuit is a converter for converting a digital home networking signal from a first frequency to a second frequency.

13. The method of claim 8, further comprising the steps of:
    determining a network characteristic associated with the second mode of operation;
    configuring the first circuit to operate according to the first power level if the network characteristic indicates that the network is operating in accordance with a first networking protocol; and configuring the first circuit to operate according to the second power level if the network characteristic indicates that the network is operating in accordance with a second different networking protocol.

14. The method of claim 13, wherein the first networking protocol is an Ethernet protocol and the second networking protocol is a Multimedia over Cable Alliance protocol.

15. The method of claim 8, further comprising the steps of:
determining a user preference for a type of network associated with the second mode of operation;
configuring the first circuit to operate according to the first power level in response to user preference identifying a first networking protocol; and
configuring the first circuit to operate according to the second power level in response to user preference identifying a second networking protocol.

16. An apparatus comprising:
an input circuit that receives a signal that is at least one of a first type of input signal or a second type of input signal;
a digital home networking circuit that transmits and receives a digital home networking signal, the digital home networking circuit operating in at least one of a first power mode and a second power mode;
a system controller coupled to said digital home networking circuit, the system controller analyzing the received input signal received to determine if the received signal is a first signal type or a second signal type, the system controller further determining at least one characteristic of an operational environment to identify a preferred mode of operation if the input signal is a second type of input signal and generating a control signal in response to the received input signal and the identified preferred mode of operation; and
a power source coupled to the digital home networking circuit and the system controller, the power source providing power to the digital home networking circuit at a first power level in the first power mode or a second power level in the second power mode in response to the control signal.

17. The apparatus of claim 16, wherein the first power level is less than the second power level.

18. The apparatus of claim 16, wherein the control signal disconnects the digital home networking circuit from said main power source, modifies a register value on the digital home networking circuit to indicate that the digital home networking circuit is to operate in a low power mode, disables a phase lock loop of the digital home networking circuit, and disables an internal clock of the digital home networking circuit.

19. The apparatus of claim 16, further comprising a converter coupled to the digital home networking circuit that converts a digital home networking signal from a first frequency to a second frequency.

20. The apparatus of claim 16, wherein the control signal modifies at least one setting on the digital home networking circuit and configures the digital home networking circuit to operate at the second power level in response to the system controller determining the received input signal is a home networking signal.

21. The apparatus of claim 20, wherein the system controller also determines a network characteristic associated with the second power mode and modifies the control signal to configure the digital home networking circuit to operate at the first power level or the second power level based on the determined network characteristic.

22. The apparatus of claim 20, wherein the system controller also determines a user preference for a type of network associated with the second power mode and modifies the control signal to configure the digital home networking circuit to operate at the first power level or the second power level based on the determined user preference.

23. An apparatus for controlling the power used in a receiver, the apparatus comprising:
a receiving circuit that receives an input signal, the input signal including at least one of a broadcast signal and a digital home networking signal;
a system controller coupled to the receiving circuit, the system controller determining if the receiver is operating in a first mode having a first power level or a second mode having a second power level based on the input signal received and generating a control signal, the control signal modifying at least one setting on the first circuit to operate in the first mode if the input signal is a broadcast signal, the system controller further modifying the control signal if the input signal is a digital home networking signal; and
a first circuit coupled to the system controller, the first circuit configured to operate at the first power level or the second power level based on the control signal provided to the first circuit.

24. The apparatus of claim 23, wherein the first circuit is disconnected from a main power source to enable a low power mode as the first mode.

25. The apparatus of claim 23, wherein the system controller modifies a register value on the first circuit to indicate that the first circuit is to operate in a low power mode as the first mode disables a phase lock loop of the first circuit, and disables an internal clock of the first circuit.

26. The apparatus of claim 23, further comprising a second circuit associated with the first circuit, the second circuit configuring to operate according to the first power level based on the control signal provided to the second circuit.

27. The apparatus of claim 26, wherein the first circuit is a digital home networking circuit able to transmit and receive digital home networking data and the second circuit is a converter for converting a digital home networking signal from a first frequency to a second frequency.

28. The apparatus of claim 23, wherein the system controller further determines a network characteristic associated with the second mode of operation, wherein the first circuit is configured to operate according to the first power level if the network characteristic indicates that the network is operating in accordance with a first networking protocol, and wherein the first circuit is configured to operate according to the second power level if the network characteristic indicates that the network is operating in accordance with a second different networking protocol.

29. The apparatus of claim 28, wherein the first networking protocol is an Ethernet protocol and the second networking protocol is a Multimedia over Cable Alliance protocol.

30. The apparatus of claim 23, wherein the system controller further determines a user preference for a type of network associated with the second mode of operation and wherein the first circuit is configured to operate according to the first power level in response to user preference identifying a first networking protocol, and wherein the first circuit is configured to operate according to the second power level in response to user preference identifying a second networking protocol.

* * * * *